(12) United States Patent
Barnes et al.

(10) Patent No.: US 11,222,194 B2
(45) Date of Patent: Jan. 11, 2022

(54) AUTOMATED SYSTEM AND METHOD FOR CREATING AND EXECUTING A SCORING GUIDE TO ASSIST IN THE ANALYSIS OF TISSUE SPECIMEN

(71) Applicant: Ventana Medical Systems, Inc., Tucson, AZ (US)

(72) Inventors: Michael Barnes, Tuscon, AZ (US); Joerg Bredno, Tuscon, AZ (US); Jim F. Martin, Tuscon, AZ (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 220 days.

(21) Appl. No.: 16/474,485

(22) PCT Filed: Dec. 20, 2017

(86) PCT No.: PCT/EP2017/083697
§ 371 (c)(1),
(2) Date: Jun. 27, 2019

(87) PCT Pub. No.: WO2018/122056
PCT Pub. Date: Jul. 5, 2018

(65) Prior Publication Data
US 2019/0340415 A1    Nov. 7, 2019

Related U.S. Application Data

(60) Provisional application No. 62/441,068, filed on Dec. 30, 2016.

(51) Int. Cl.
*G06K 9/00* (2006.01)
*G06K 9/62* (2006.01)
*G06T 7/00* (2017.01)

(52) U.S. Cl.
CPC ....... *G06K 9/00147* (2013.01); *G06K 9/0014* (2013.01); *G06K 9/6254* (2013.01);
(Continued)

(58) Field of Classification Search
USPC .................................................. 382/133, 128
See application file for complete search history.

(56) References Cited

U.S. PATENT DOCUMENTS 7,949,181 B2 * 5/2011 Padfield ............... G06K 9/0014
382/164
8,077,958 B2 * 12/2011 Qian .................... G06K 9/0014
382/133

(Continued)

FOREIGN PATENT DOCUMENTS

WO    WO-2016075096 A1 * 5/2016 ........... G06K 9/0014

OTHER PUBLICATIONS

Terashima et al., Brain Research 650 (1994) 133-139.
(Continued)

*Primary Examiner* — Ishrat I Sherali
(74) *Attorney, Agent, or Firm* — Kilpatrick Townsend & Stockton LLP (57) ABSTRACT

Systems and methods disclosed herein describe a platform that automatically creates and executes a scoring guide for use in anatomical pathology. The platform can employ a fully-automated workflow for clustering the biological objects of interest and for providing cell-by-cell read-outs of heterogeneous tumor biomarkers based on their stain appearance. The platform can include a module for automatically creating and storing a scoring guide in a training database based on training digital images (240, 250), and an object classification module that executes the scoring guide when presented with new digital images to be scored pursuant to the scoring guide (299).

18 Claims, 8 Drawing Sheets (52) U.S. Cl.
CPC .. *G06T 7/0012* (2013.01); *G06T 2207/20081* (2013.01); *G06T 2207/30024* (2013.01)

(56) References Cited

U.S. PATENT DOCUMENTS

| | | | | |
|---|---|---|---|---|
| 8,107,710 | B2* | 1/2012 | Salafia | G06T 7/0012 |
| | | | | 382/133 |
| 9,036,888 | B2* | 5/2015 | Kamath | G06K 9/6253 |
| | | | | 382/133 |
| 9,424,460 | B2* | 8/2016 | Madabhushi | G16H 50/20 |
| 10,049,447 | B2* | 8/2018 | Lloyd | G06K 9/00147 |
| 10,943,345 | B2* | 3/2021 | Barker | G06K 9/0014 |
| 2008/0033657 | A1* | 2/2008 | Cline | G06T 7/41 |
| | | | | 702/19 |
| 2010/0220916 | A1* | 9/2010 | Salafia | G06T 7/0012 |
| | | | | 382/134 |
| 2015/0254493 | A1* | 9/2015 | Madabhushi | G06F 19/00 |
| | | | | 382/133 |
| 2015/0293992 | A1* | 10/2015 | Meehan | G06F 17/18 |
| | | | | 707/740 |
| 2016/0314580 | A1* | 10/2016 | Lloyd | G06T 7/0012 |
| 2017/0270346 | A1* | 9/2017 | Ascierto | G06T 7/11 |
| 2018/0018386 | A1* | 1/2018 | Orlova | G06F 3/0482 |
| 2019/0025312 | A1* | 1/2019 | Dittamore | G01N 21/00 |
| 2020/0302603 | A1* | 9/2020 | Barnes | G06T 7/0012 |

OTHER PUBLICATIONS

International Search Report and Written Opinion dated Feb. 22, 2018 in connection with PCT/EP2017/083697 filed Dec. 20, 2017.
Ugo Erra, et al., "An Interactive Bio-Inspired Approach to Clustering and Visualizing Datasets," 2011 15th International Conference on Information Visualization, pp. 440-447.

* cited by examiner

AUTOMATED SYSTEM AND METHOD FOR CREATING AND EXECUTING A SCORING GUIDE TO ASSIST IN THE ANALYSIS OF TISSUE SPECIMEN

CROSS-REFERENCES TO RELATED APPLICATIONS

This is a national phase filing of International Patent Application No. PCT/EP2017/083697, filed Dec. 20, 2017, which claims the benefit and priority of U.S. Provisional Application Ser. No. 62/441,068, filed Dec. 30, 2016, both of which applications are incorporated herein by reference.

TECHNICAL FIELD

The present disclosure generally relates to a platform for the automatic creation and execution of a scoring guide for use in anatomical pathology. More particularly, the present platform employs a fully-automated technique for clustering biological objects of interest and for providing cell-by-cell read-outs of heterogeneous tumor biomarkers based on their stain appearance.

BACKGROUND

Biological specimens such as tissue sections, blood, cell cultures, and like biological samples, are mounted on a slide, stained with one or more combinations of stain and biomarkers, and the resulting assay is imaged for further analysis of the content of the specimens using a digital pathology system. Expert observers routinely assess the tissue status for the biomarkers, and use the results of the tissue assessment for various purposes, such as: diagnosis, therapy decision, therapy outcome assessment, etc.

Anatomical pathology using immunohistochemistry aims at interrogating tissue for a variety of biomarkers. In many cases, a biomarker stains a certain cell compartment (e.g., Ki-67 in a cell nucleus or HER2 on a cell membrane), which results in a respective characteristic staining pattern. However, in many cases, the different staining aspects might occur together in different intensities, which results in challenges for the visual assessment by expert observers and the automatic analysis of cells interrogated for such biomarkers.

A conventional read-out can assess a field of view (FOV), a tissue region of interest, or even a whole-slide image of a tumor based on the number of tumor cells that are positive or negative for a biomarker. For some applications, cells or other biological objects of interest, especially tumor cells, can vary strongly in staining intensity, size, shape, texture, or appearance of the staining response. In this case, a typical "negative tumor cell" or "positive tumor cell" analysis might need to be extended to include additional cell classes, such as for cells of different size, shape, texture, etc.

For diagnosis, therapy decision, or treatment outcome assessment, the number of tumor cells in each class in a relevant tissue region and their spatial relation might need to be assessed. However, especially in the presence of multiple different cell classes, it becomes challenging to create a scoring guide (i.e., a standardized set of instructions how to score and classify each cell) and to execute this scoring guide reproducibly when reading a slide. Current manual scoring is typically limited to a count of positive and negative cells, possibly extended with an overall assessment of staining intensities.

SUMMARY

The present disclosure addresses the foregoing concerns by providing, among other things, a methodology that would allow for a computationally objective characterization and clustering of scoring patterns to systematically and thoroughly analyze staining expressions, in order to objectively ascribe patterns to the observed biology and biomarkers, as opposed to forcing the observed biology into a limited amount of manual techniques.

More specifically, the present disclosure provides a system, a platform, a computer-implemented method of operation, and a clinical workflow (collectively referred to herein as "the system," "the platform," or "the method") for the automatic creation and execution of a scoring guide for use in anatomical pathology. The platform employs a fully-automated technique for clustering the cells or other biological objects of interest, and for providing cell-by-cell read-outs of heterogeneous tumor biomarkers based on their stain appearance.

To this end, the system may include an imaging module that presents training digital images as well as digital images to be scored, and a memory that stores a plurality of executable modules. In general, the executable modules may include modules for the preparation of a training scoring guide that is stored in a training database, and an object classification module that executes the scoring guide when presented with new digital images to be scored pursuant to the scoring guide.

More specifically, in one embodiment, the executable module used in the preparation of the scoring guide includes an object of interest extraction module that creates a preliminary, unscored image analysis of the training digital images, in order to identify all the objects of interest contained therein. A feature extraction module can automatically extract the features of each object of interest in the unscored image analysis, and then automatically cluster the objects in classifiable clusters, based on the extracted features.

Optionally, the user can interactively refine these clusters into newly refined clusters. The clusters can be presented to the user as galleries of objects that belong to a cluster. A scoring guide generation module uses the refined clusters to define the scoring guide that assigns the objects of interest into individual clusters.

The scoring guide, which includes the automatic clustering rules or instructions together with image galleries of the objects, can then be stored in the training database.

The scoring guide can then be applied to digital images of cells in a new digital image or on a new tissue slide. To this end, the digital images of the cells to be scored can be inputted to the object of interest extraction module, which upon execution, can create a preliminary image analysis to detect all the cells of interest in the digital images.

The feature extraction module can be executed to extract the features of each object of interest, using the features that were used during the generation of the scoring guide and that are stored in the training database. Based on the extracted features, an object classification module can then be executed to automatically assign each object to a corresponding cluster, such that the object is similar to those from the training set in the clusters stored in the training database. The system may then present the final automatic image analysis, as a ready to be scored, as an object-by-object readout to the user.

In one aspect of the present disclosure is a method of analyzing a set of objects of interest, the method comprising: automatically creating a scoring guide by collecting the set of objects of interest, extracting a plurality of features of each object of interest, based on at least on the extracted features, automatically clustering each object of interest into a plurality of classifiable subsets, and automatically defining a scoring guide based on the classifiable subsets. In some embodiments, the method further comprises executing the scoring guide onto a new set of objects of interest, to automatically cluster each new object of interest into one of the classifiable subsets; and providing an object-by-object report based on the execution of the scoring guide. In some embodiments, the step of creating the scoring guide further includes detecting the objects of interest in the collected set. In some embodiments, the collected set of objects of interest includes training objects of interest. In some embodiments, the step of creating the scoring guide further includes, prior to defining the scoring guide, interactively refining the classifiable subsets; and defining the scoring guide is based on the refined classifiable subsets. In an embodiment, refining the classifiable subsets includes allows a user to name the classifiable subsets. In another embodiment, refining the classifiable subsets includes allows a user to merge the classifiable subsets as containing objects of interest with a substantially similar meaning. In another embodiment, refining the classifiable subsets includes allows a user to split at least one classifiable subset into two or more subsets that contain objects of interest with substantially different meanings. In some embodiments, executing the scoring guide onto the new set of objects of interest includes detecting the objects of interest in the new set. In a nembodiment, executing the scoring guide onto the new set of objects of interest further includes, for each object of interest in the new set, automatically assigning a matching subset based on the scoring guide. In an embodiment, providing the object-by-object report includes reporting the number and spatial distribution of the objects of interest separately for each subset.

In some embodiments, the objects of interest include biological cells. In some embodiments, providing the object-by-object report includes providing a cell-by-cell read-out of heterogeneous tumor biomarkers based on stain appearances. In some embodiments, the biological cells are mounted onto a glass slide. In some embodiments, executing the scoring guide includes using digital images of the glass slide. In an embodiment, automatically clustering each object of interest into classifiable subsets is performed using a k-means algorithm.

In one aspect of the present disclosure is a platform for analyzing a set of objects of interest by means of an automatically created scoring guide, the platform comprising: a module for collecting the set of objects of interest; a module for extracting a plurality of features of each object of interest; a module for automatically clustering each object of interest into a plurality of classifiable subsets based at least on the extracted features; and a module for automatically defining a scoring guide based on the classifiable subsets. In some embodiments, the platform further comprises a module for executing the scoring guide onto a new set of objects of interest, to automatically cluster each new object of interest into one of the classifiable subset, and for providing an object-by-object report based on the execution of the scoring guide. In some embodiments, the module for executing the scoring guide onto the new set of objects of interest includes a module for detecting the objects of interest in the new set. In some embodiments of the platform, executing the module for executing the scoring guide onto the new set of objects of interest further includes a module for automatically assigning a matching subset for each object of interest in the new set, based on the scoring guide. In some embodiments of the platform, the objects of interest include biological cells. In some embodiments, the module for automatically clustering each object of interest into classifiable subsets automatically clusters each object of interest using a k-means algorithm.

In one aspect of the present disclosure is a non-transitory computer-readable medium comprising instructions which, when executed by a processor, cause the processor to perform a plurality of operations comprising: automatically creating a scoring guide by collecting the set of objects of interest, extracting a plurality of features of each object of interest, based at least on the extracted features, automatically clustering each object of interest into classifiable subsets, automatically defining a scoring guide based on the classifiable subsets, and executing the scoring guide onto a new set of objects of interest, to automatically cluster each new object of interest into one of the classifiable subsets; and providing an object-by-object report based on the execution of the scoring guide. In some embodiments, automatically clustering each object of interest into classifiable subsets is performed using a k-means algorithm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The various features of the present disclosure and the manner of attaining them will be described in greater detail with reference to the following description, claims, and drawings wherein:

It will be appreciated that for simplicity and clarity of illustration, reference numbers may be reused among the figures to indicate corresponding or analogous features.

DETAILED DESCRIPTION

Figure 1:
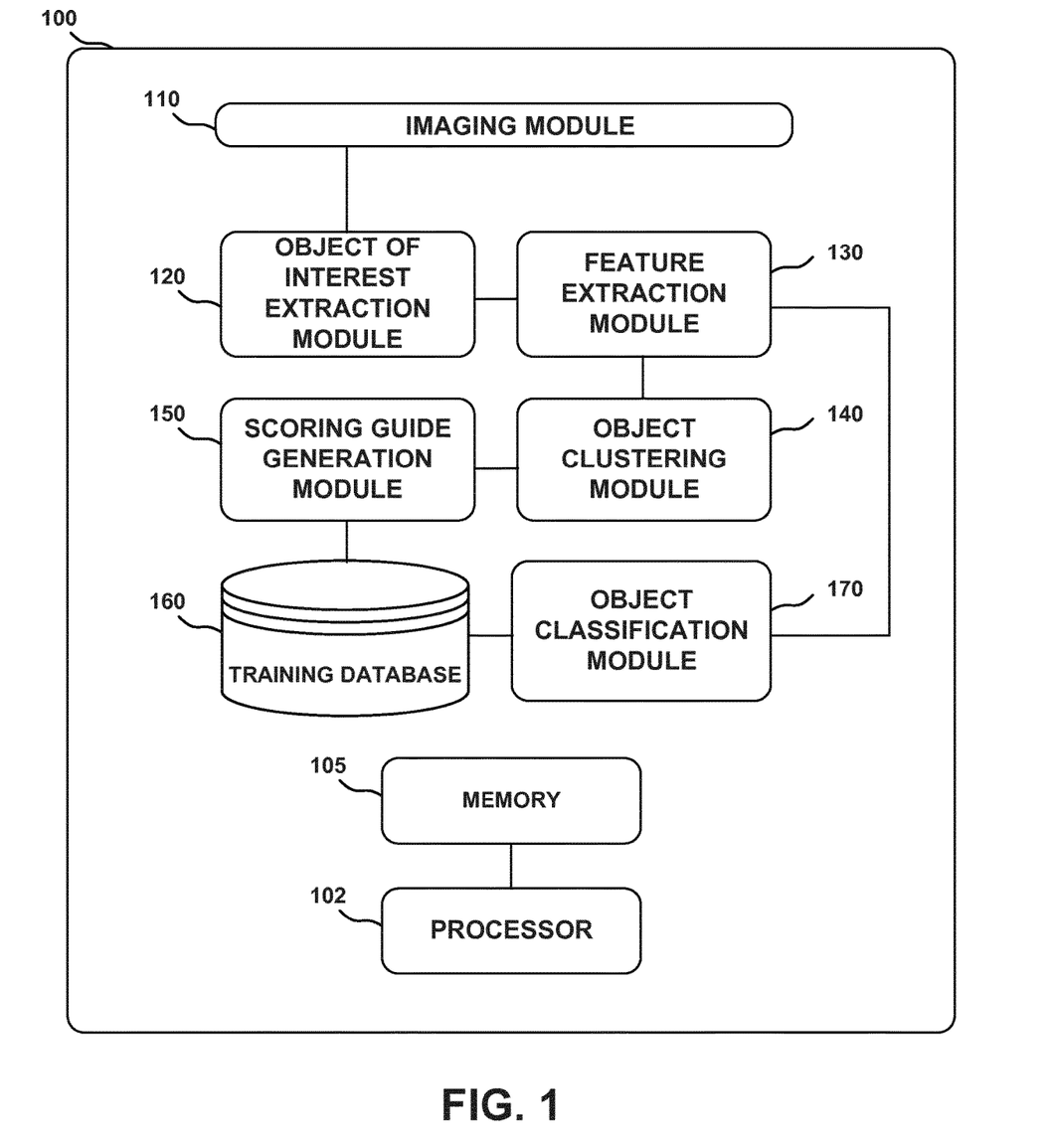
FIG. 1 depicts a computer-based automated system for the creation and execution of a scoring guide to assist in the analysis of tissue specimen, in accordance with an exemplary embodiment of the subject disclosure.

FIG. 1 depicts a computer-based automated system 100 for the creation and execution of a scoring guide to assist in the analysis of tissue specimen, according to an exemplary embodiment of the subject disclosure. As used herein, the term "tissue specimen" encompasses any type of biological specimen such as tissue sections, blood, cell cultures, and like biological samples, that can be mounted on a slide.

In use, the workflow of the system 100 can be an integrated, single user interface workflow that provides the user with the ability to accurately and precisely create and execute a scoring guide for use in anatomical pathology. More particularly, the present platform employs a fully-automated technique for clustering the cells and for providing cell-by-cell read-outs of heterogeneous tumor biomarkers based on their stain appearance.

System 100 comprises a plurality of processing modules or logical instructions that can be executed by processor 102. A "module" as understood herein can be implemented as hardware modules, or as software modules that encompass a software, instruction codes, hardware module, or a combination thereof, which provides the respective functionality, and which can be stored in memory 105 (or in another memory that may be accessible by the processor 102). Besides processor 102 and memory 105, system 100 can also include user input and output devices such as a keyboard, mouse, stylus, and a display/touchscreen. As it will be explained in the following discussion, processor 102 can execute logical instructions stored on memory 105, perform image analysis and other quantitative operations, resulting in an output of results to a user system 100 or via a network.

In one embodiment, an imaging module 110 may provide image data from one or more scanned slides to, for example, memory 105. The image data may include an image, as well as any information related to an imaging platform on which the image was generated. The present disclosure may be applicable to a set of digital images 210, 270 (FIG. 2) showing stained tissue sections. The slides can be stained with Heamtoxylin and Eosin (H&E), special stains, immunohistochemistry (IHC), in-situ-hybridization (ISH), or other staining technologies with brightfield chromogens or fluorescent markers. The digital images 210, 270 can be created in brightfield or fluorescence imagers that create field-of-view images, large-area scans, or whole-slide scans.

An object of interest extraction module 120 may be executed to facilitate the identification and extraction of the objects of interest. In one embodiment, the objects of interest include all the cells within the tissue specimen. It should be understood that while the present disclosure refers to tissue cells as objects of interest, the invention is not limited to tissue cells and may be extended, for example, to a selection of cells on the tissue, like tumor cells, immune cells, or stromal cells, or to include further objects of interest depicted in a digital image like blood vessels, lymph vessels, tumor glands, airways, lymphatic aggregates, and other objects.

A feature extraction module 130 may be executed to facilitate feature extraction by using, for example, known or available image processing methods to extract and measure the features of each individual cell. Exemplary cell features to be extracted may include the cell size, shape, staining intensity, texture, staining response, etc.

Subsequent to the features extraction, an object clustering module 140 may be executed to automatically cluster the extracted cell features, in order to create distinct classes (i.e., subsets, clusters, compartments, or galleries) of cells from all the cells in the training set. In some embodiments, as a result of the clustering, the features of the cells in one subset are substantially similar to those of the other cells in the same subset, and the features of the cells in different subsets possess substantially different features. Alternatively or in addition, in some embodiments, as a result of the clustering, the cells in one subset are more similar to other cells in the same subset than to cells in other subsets. In some embodiments, similarity between two cells can be defined as a distance between the feature vectors of the two cells, where the distance may be, for example, a weighted or an unweighted Euclidean distance. In some embodiments, object clustering module 140 may use a k-means clustering algorithm to cluster the cells into different classes, where k-means clustering algorithm includes any variation of k-means clustering algorithms. Specifically, in some examples, object clustering module 140 may use a k-means algorithm described in Hartigan J A, Wong M A. Algorithm AS 136: A k-means clustering algorithm, Journal of the Royal Statistical Society, Series C (Applied Statistics), 1979 Jan. 1; 28(1):100-8). The object clustering module 140 can for example use the number of classes or clusters as a parameter.

Once the cells are clustered into their respective classes, these classes may optionally be interactively refined or adjusted, to better suit the goals of the application to which the present disclosure is being applied.

Once every cell has been automatically assigned to one of the clusters, a scoring guide generation module 150 may be executed to create an automatic scoring guide. The scoring guide may include a standardized set of instructions on how to automatically score and classify the cells based on their identifiable features or characteristics.

The scoring guide is then stored in a training database 160 so that it may be executed by an object classification module 170, in order to apply the rules or instructions of the scoring guide to cells in a new field of view or on a new tissue slide. A visual representation of the scoring guide can further be presented to users.

Figure 2:
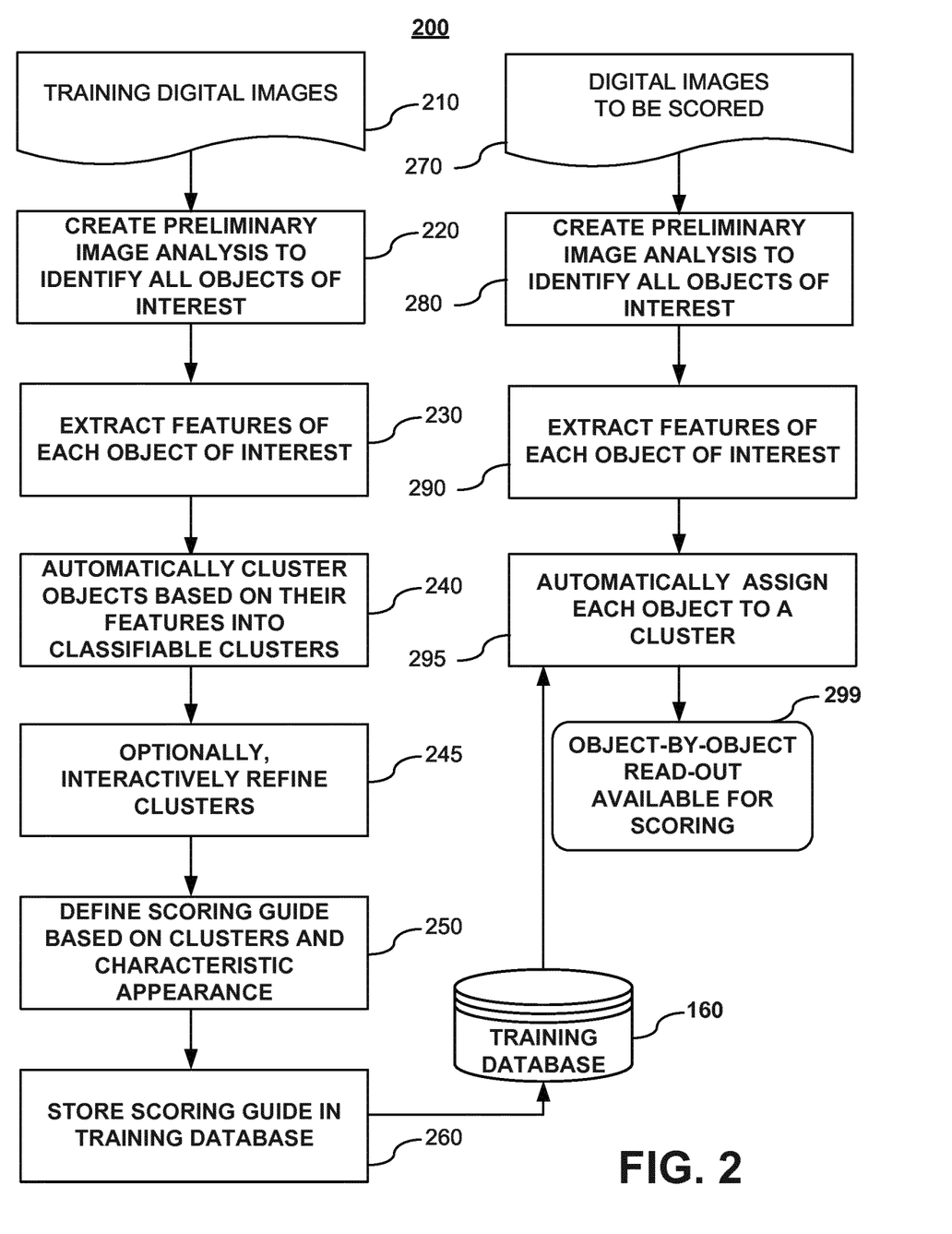
FIG. 2 illustrates a workflow for the creation and execution of the scoring guide that is generated by the system of FIG. 1, in accordance with an exemplary embodiment of the subject disclosure.

With further reference to FIG. 2, it illustrates a workflow (or method) 200 for the creation and execution of the scoring guide that is generated by the system 100 of FIG. 1, in accordance with an exemplary embodiment of the subject disclosure. Although the present disclosure is described herein in connection with the automated creation and application of a scoring guide for tissue sections from colorectal cancer (CRC) that have been stained with the brightfield IHC marker 3,3'-Diaminobenzidine (DAB) and primary antibodies for Epidermal Growth Factor Receptor (EGFR), Epiregulin (EREG), and Amphiregulin (AREG), for the purpose of illustration only, it should be clear that the present disclosure may be applicable to a wide variety of tissue and disease types using singleplex and multiplex-stained slides images in brightfield or fluorescence, as well as for the creation and execution of scoring guides for other specimens and other objects of interest.

At step 210 of workflow 200, a set of training digital images 210 with stained tissue sections, is inputted to the system 100 via imaging module 110. An automated, semi-automated, or interactive image analysis method or algorithm may be used at step 220 to detect every object of interest, e.g., every cell, in the training digital images.

Figure 3:
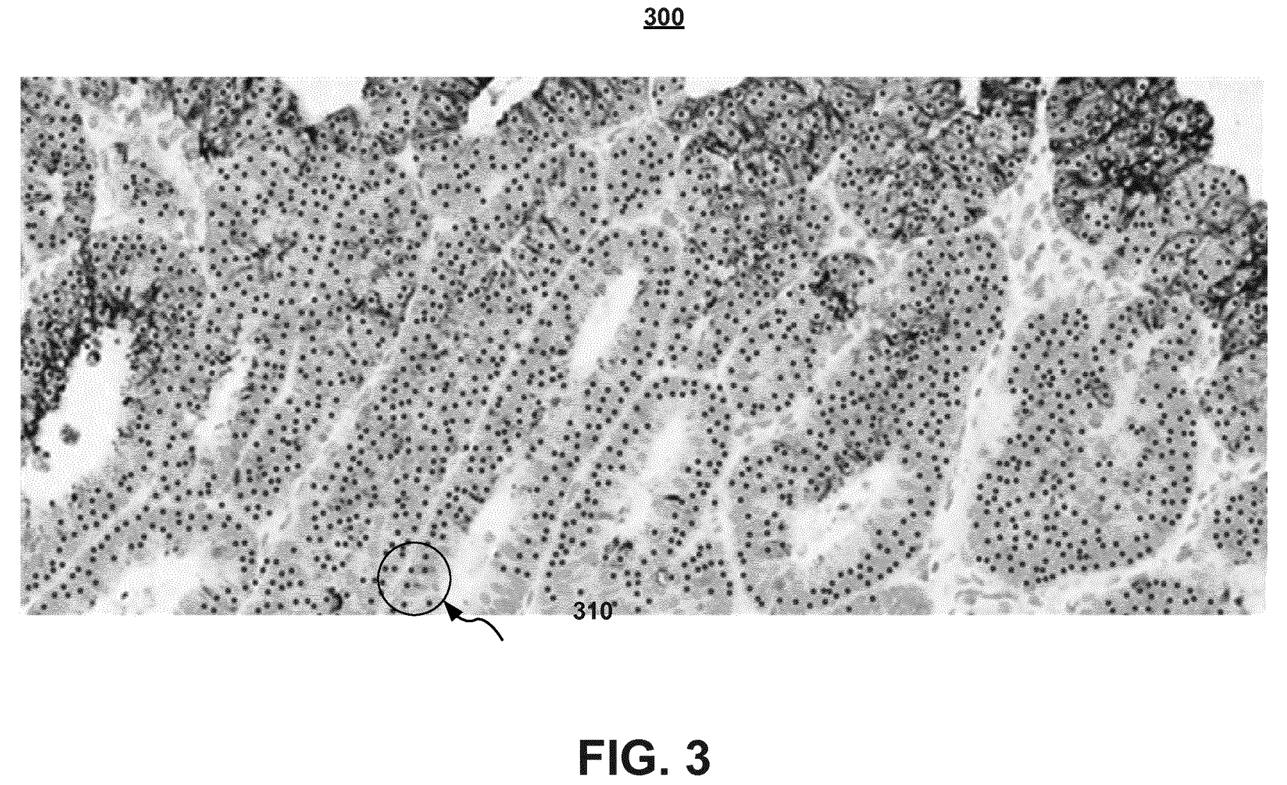
FIG. 3 is a screen shot of an unscored image analysis resulting from the implementation of a step of creating a preliminary image analysis that forms part of the workflow of FIG. 2, in accordance with an exemplary embodiment of the subject disclosure.

FIG. 3 represents an exemplary field of view of an unscored image 300 that results from the implementation of the object of interest extraction module 120 for creating a preliminary image analysis (step 220 of FIG. 2), in order to identify all the objects of interest in the tissue specimen. In the unscored image 300, each dot 310 represents an object of interest or one tumor cell in AREG-stained CRC tissue sections of the tissue specimen, in accordance with an exemplary embodiment of the subject disclosure. At this stage, the cells 310 have not been characterized yet, but are identified for eventual scoring. As further shown in FIG. 3, some tumor cells can have no (DAB) staining (these are usually called IHC-negative), while other cells can show the staining with different intensities in different cellular compartments.

Conventionally, a read-out of the unscored image 300 will need to identify and separately count the cells 310 according to their staining patterns, as follows:

A first expert observer manually collects and marks the cells 310 based on their staining pattern, and identifies each staining pattern.

The annotations are collected from the first expert observer and summarized into a scoring guide to train other expert observers.

The collections from the first expert observer can further be used to train or develop an image analysis algorithm.

These steps are tedious, error-prone, and make it quite difficult to define different classes that are representative of all the cells on the tissue specimen or a selection of tissue specimens from patients with a similar disease. In order to address this and other concerns, the workflow 200 of the present disclosure describes a method of automatically creating a scoring guide from the set of example cells 310 within the unscored image 300, which need to be classified.

To this end, the feature extraction module 130 extracts quantitative features for each cell 310 (step 230). Numerous quantitative features can be selectively extracted, including for example, the size, shape, and texture of each cell 310, the descriptive statistics of staining intensities that occur in each cell 310 or regions that surround the cell 310, and the local density of the cells 310. Reference is made for example, to Nguyen K, Bredno J, Knowles D A. "Using contextual information to classify nuclei in histology images," 2015 IEEE 12th International Symposium on Biomedical Imaging (ISBI) 2015 Apr. 16 (pp. 995-998).

As a result of the features extraction step 230, each cell 310 can be represented by a set of extracted features. The object clustering module 140 may be executed to automatically cluster the extracted cells 310 based on their corresponding features, in order to create distinct classifiable classes of cells from all the cells 310 in the training set (step 240).

Figure 4:
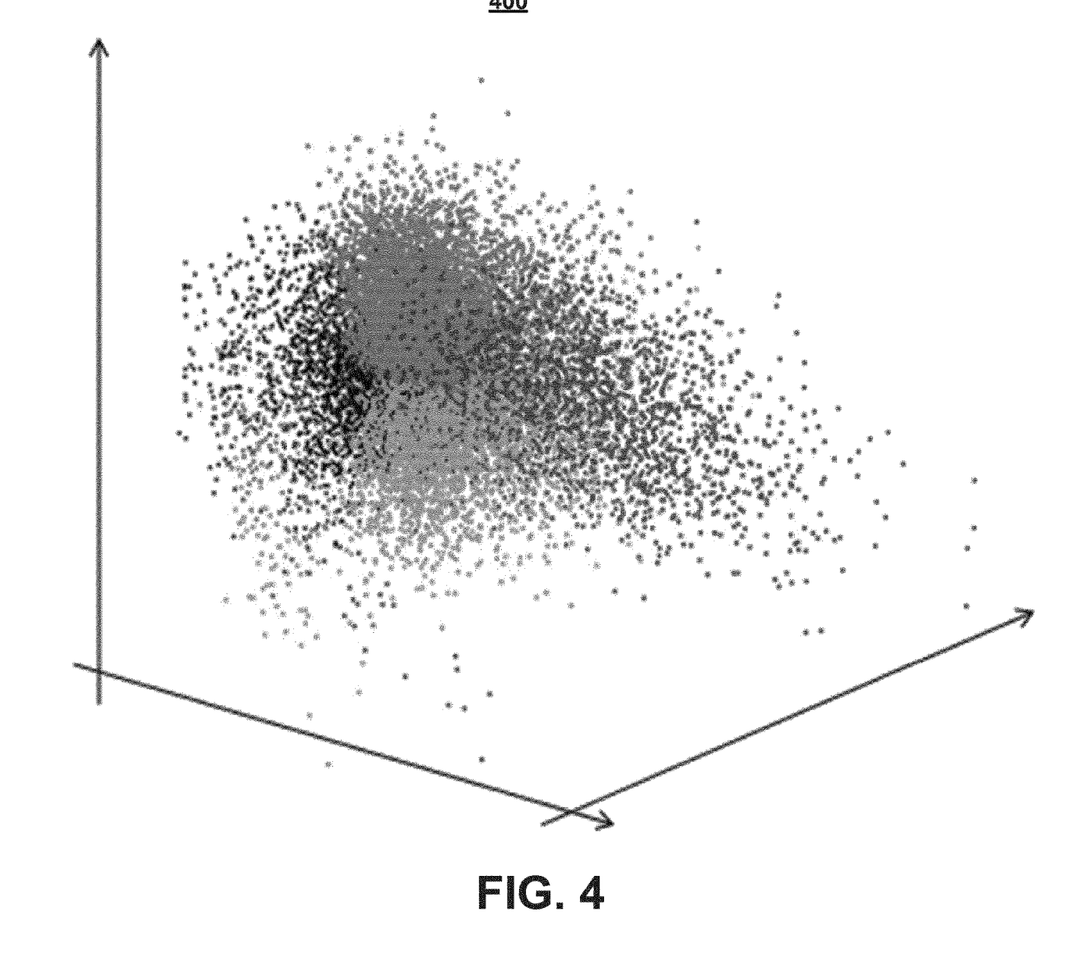
FIG. 4 is a screen shot that represents a three-dimensional data visualization output of an automated clustering step of the workflow of FIG. 2, in accordance with an exemplary embodiment of the subject disclosure.

FIG. 4 represents a three-dimensional data visualization 400 of the features extracted for all the cells 310, as a point cloud, and shows the results of the automated clustering step 240 in four exemplary colors: red, green, blue, and black. It should be clear that more than three features had been extracted for every cell 310, and that FIG. 4 shows an approximate visualization using three dimensions. In the example illustrated in FIG. 4, fifteen thousand, two hundred and sixty-three (15,263) IHC-positive tumor cells were collected from one hundred and twenty-two (122) field of view images, taken from thirty-three (33) whole-slide images of tissue specimens collected from patients with colorectal cancer.

Figure 5A:
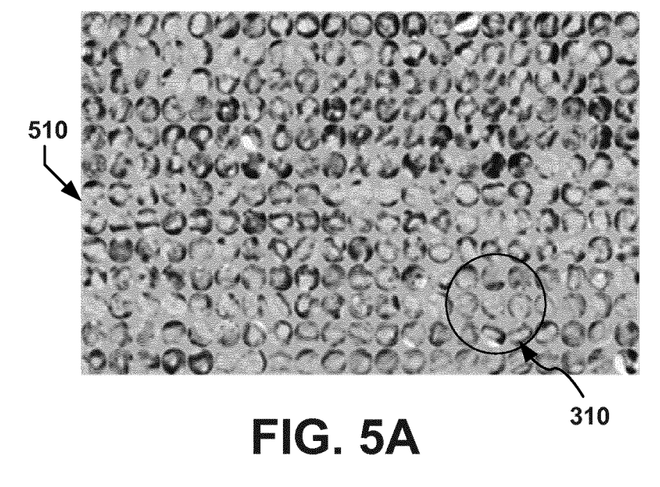
FIG. 5A through 5E are screen shots that represent image views of various cell clusters or galleries that automatically result from the implementation of the automated clustering step of the workflow of FIG. 2, in accordance with an exemplary embodiment of the subject disclosure.
Figure 5B:
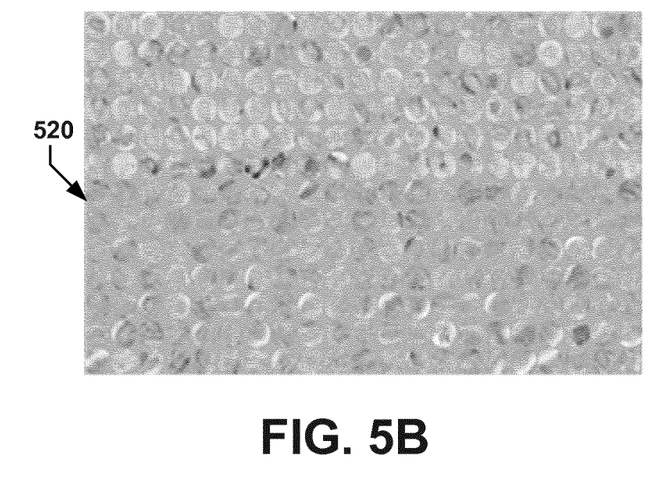
Figure 5C:
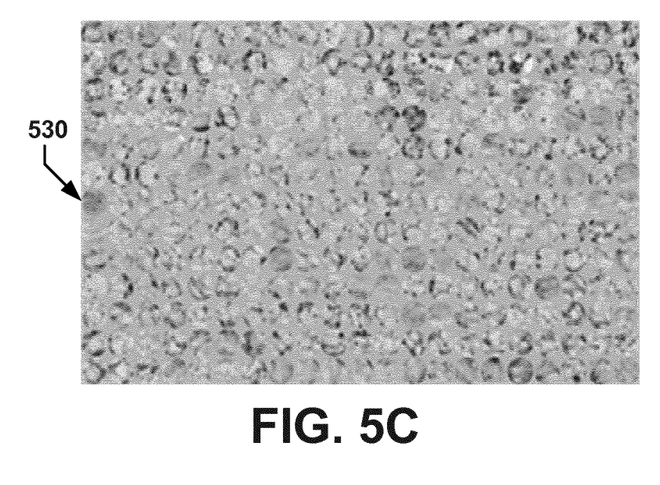
Figure 5D:
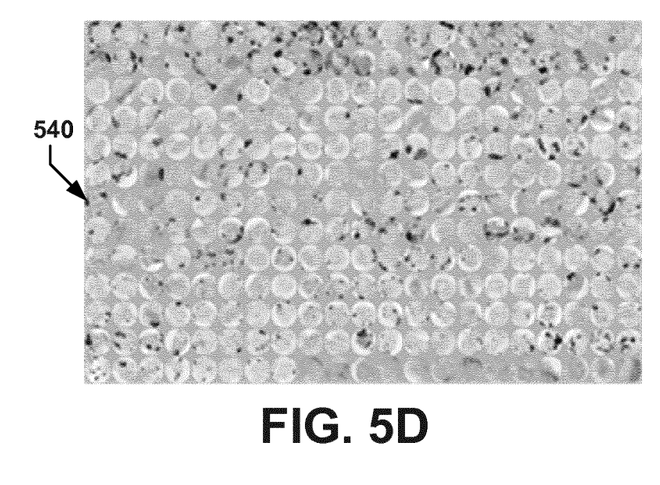
Figure 5E:
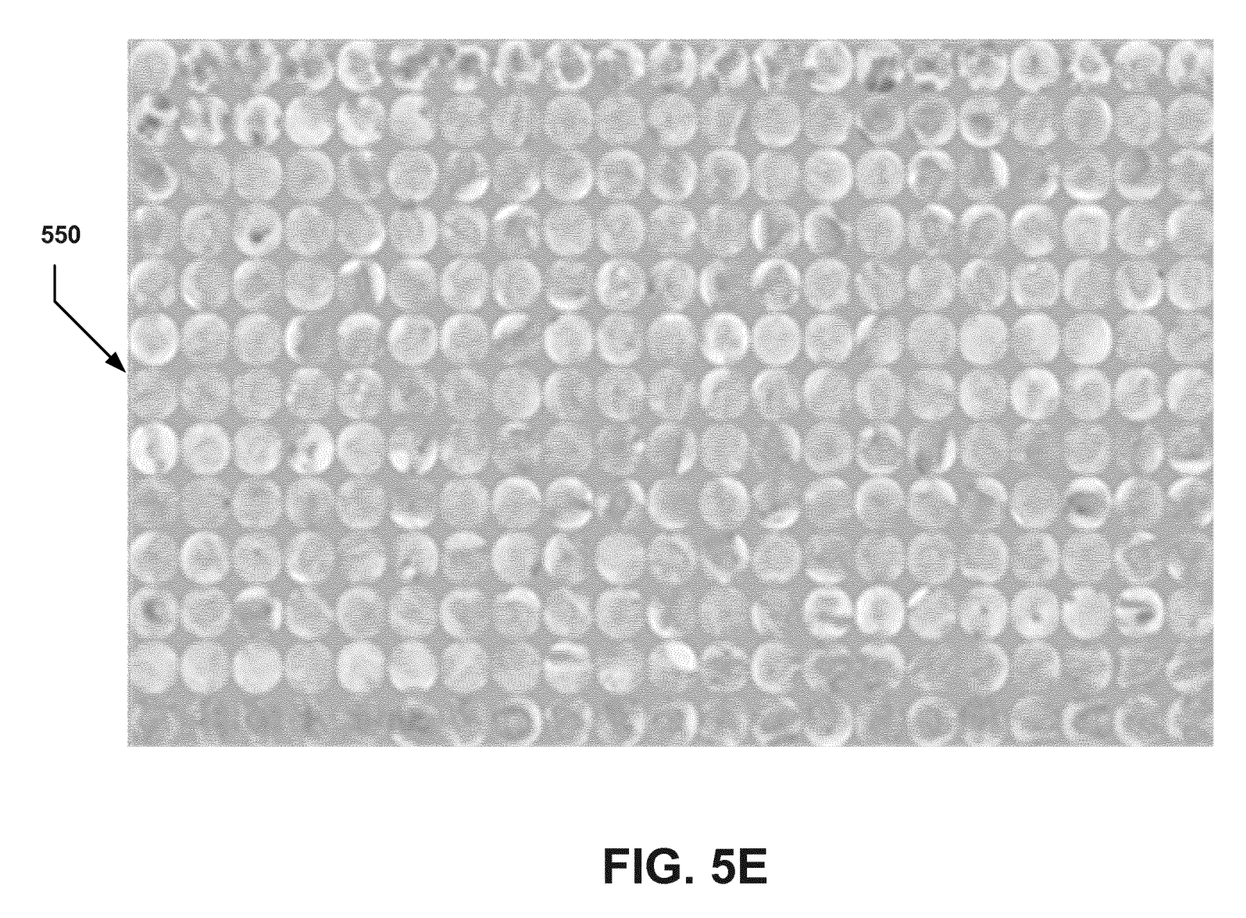

The features are quantitative measurements of cell properties. While these can be presented to a user in tabular form or any other suitable form of data representation, it is difficult to determine the underlying biology from a presentation of the features alone. In order to allow a user to explore and assess the automatically determined clusters, two different visualization techniques can be used. FIG. 5A through 5E are screen shots that represent image views of various cell clusters or galleries 510, 520, 530, 540, 550 that automatically result from the implementation of the automated clustering step 240 or a refinement step 245, of the workflow 200. In one embodiment, the galleries 510, 520, 530, 540 of FIGS. 5A-5D, respectively, represent cells belonging to four different clusters of IHC-positive cells, and the gallery 540 of FIG. 5E represents negative tumor cells. These galleries are created by selecting cells belonging to one cluster and cutting out small image regions from the digital images where these cells were detected. A presentation of the cells in adjacent clusters allows a user to assess their biological properties and to further assess, for example, whether cells in one cluster appear substantially similar to those of the other cells in the same subset, and if cells in different clusters appear substantially different.

The image views of FIGS. 5A through 5E therefore offer an alternative, more user-friendly representation of the point cloud data visualization 400 of FIG. 4. The cell galleries 510, 520, 530, 540, 550 are created by presenting the images of cells 310 with similar features adjacent to each other. A further alternative, user-friendly representation of the point cloud data can be created by presenting the digital training images and marking each cell and object of interest with a marker of a different color, where each color represents on cluster. This creates images similar to image 610 in FIG. 6A.

At an optional interactive refinement step 245, a user can update the galleries 510, 520, 530, 540, 550 that were automatically generated by the clustering step 240 via the following three exemplary basic operations:

A user can identify and name the type of cells 310 presented in a gallery with a biologically meaningful name (e.g., "strong complete membranous staining" or "partial granular staining"). These names can for example be used to document the automatically determined clusters in a user-readable scoring guide, or to label automatic image analysis results in a read-out.

A user may disagree with the automatic clustering of the cells, and has the ability to merge two or more cell galleries, to give the cells from the merged clusters the same biological meaning.

A user who disagrees with the automatic clustering of the cells can alternatively request the splitting of a gallery which is believed to contain cells with substantially different biological meanings. Automatic clustering is then applied to the cells in the refined galleries, which results in a new set of clusters that replaces the cluster that a user disagreed with.

At step 250, the cell galleries 510, 520, 530, 540, 550 resulting from the automatic clustering step 240 or from the optional interactive refinement step 245, are used to define the scoring guide (step 250). At this stage, the rules or instructions of the scoring guide that have been automatically determined by the scoring guide generation module 150, at steps 240, 245, to assign cells into the individual clusters are known, and are stored in the training database 160, at step 260, in order to train the fully automated image analysis system 100. The data in the training database 160 might include information about the center and extend of clusters in feature space. It might further include quantitative decision boundaries between two clusters. Such decision boundaries are sets of automatically executable rules that allow to decide into which cluster a new cell with a new set of features belongs. The information in training database 160 may further be used to create a visual representation of the scoring guide similar to present the scoring guide to users. Such a scoring guide document might include cell galleries 510, 520, 530, 540, 550, digital images with markings for each object of interest 610, and the name and type of cells that was provided in the interactive step 245.

The rules of the scoring guide can be applied to digital images of cells in a new field of view or on a new tissue slide upon execution of the scoring guide. To this end, the digital images of tissue specimens to be scored are inputted to the object of interest extraction module 120, at step 210. As described earlier, upon execution, the object of interest extraction module 120 creates a preliminary image analysis to identify all the cells of interest in the digital images, at step 280.

The feature extraction module 130 is executed to extract the features of each cell, at step 290, using the features that were used during the generation of the scoring guide and that are stored in the training database 160. Based on the extracted features, an object classification module 170 is then executed to automatically assign each cell to a corresponding cluster (step 295), such that the cell is similar to those in one of the cell galleries 510, 520, 530, 540, 550 that are stored in the training database 160.

Figure 6A:
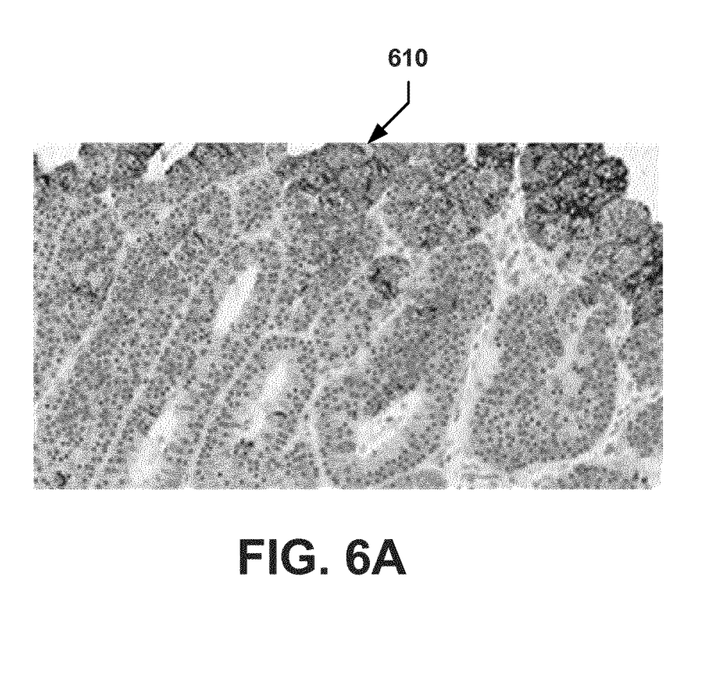
FIGS. 6A through 6D are screen shots of an object-by-object read-out that automatically results from the implementation of an automated step of the workflow of FIG. 2 for assigning each object to a corresponding cluster, in accordance with an exemplary embodiment of the subject disclosure.
Figure 6B:
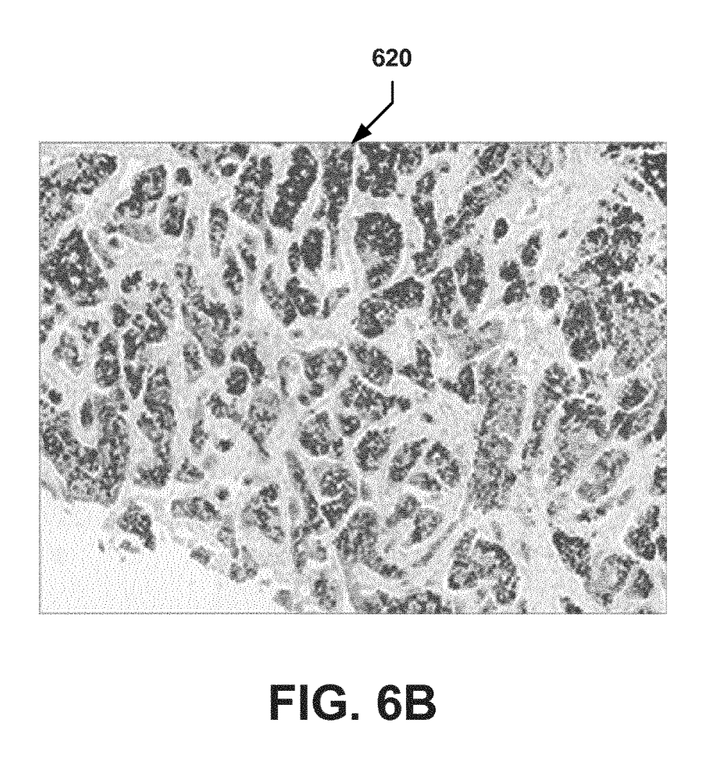
Figure 6C:
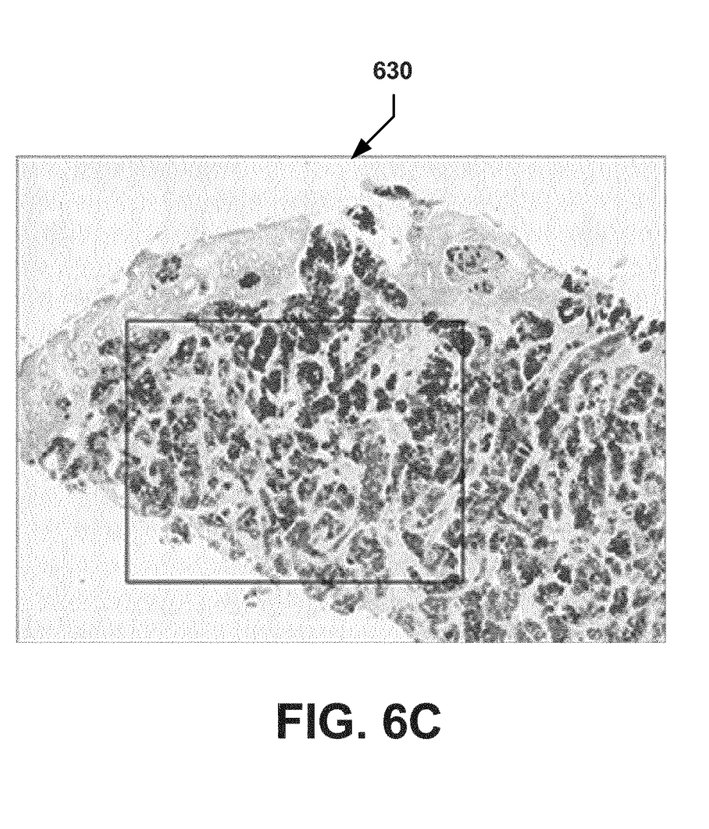
Figure 6D:
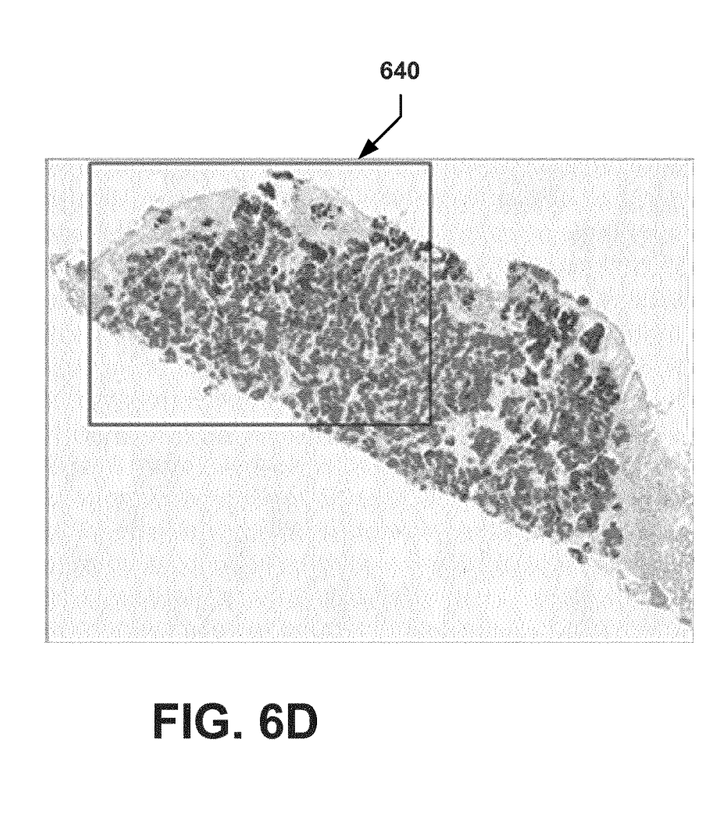

System 100 then presents the final automatic image analysis, as a ready to be scored, object-by-object readout to the user (step 299). FIGS. 6A through 6D provide an exemplary report resulting from the application of the workflow 200 to an AREG-stained image. FIG. 6A shows a field of view 610, and FIGS. 6B through 6D illustrate different magnification (or zoom) levels 620, 630, 640 of a whole-slide image analysis result that implements the automatically generated scoring guide. In this example, the IHC-negative tumor cells are shown in a distinctive color such as blue, and wherein four automatically defined IHC-positive cell types are shown in four different corresponding colors such as: yellow, orange, red, and purple. A readout presented to users may include images like 610, 620, 630, 640, counts of cells that were found to belong to the different clusters, or any other human or computer-readable representation that describes the location and count of cells in each cluster.

In each of the flow charts described herein, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, the use of a specific sequence of steps is not meant to imply any limitations on the invention. Changes may be made with regards to the sequence of steps without departing from the spirit or scope of the present invention. The use of a particular sequence is therefore, not to be taken in a limiting sense, and the scope of the present invention is defined only by the appended claims.

As it will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As it will be further appreciated, the processes in embodiments of the present invention may be implemented using any combination of software, firmware or hardware. As a preparatory step to practicing the invention in software, the programming code (whether software or firmware) will typically be stored in one or more computer readable storage mediums for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while illustrative embodiments of the present invention are described in the context of a fully functional computer (server) system with installed (or executed) software, those skilled in the art will appreciate that the software aspects of the illustrative embodiments of the present invention are capable of being distributed as a program product in a variety of forms, and that an illustrative embodiment of the present invention applies equally regardless of the particular type of media used to actually carry out the distribution.

In addition, while the present invention has been described with reference to exemplary embodiments, it will be understood by those skilled in the art that various changes may be made and equivalents may be substituted for elements thereof without departing from the scope of the invention. Furthermore, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims.

As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another. In addition, listing terms such as "a", "b", c", "first", "second", and "third" are used herein and in the appended claims for purposes of description and are not intended to indicate or imply relative importance or significance.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Various publications are cited herein, the disclosures of which are incorporated by reference in their entireties.

The invention claimed is:

1. A method of analyzing a set of objects of interest, the method comprising:
    accessing, by one or more processors of a computer system, a scoring guide from a database, wherein the scoring guide facilitates classification of an object of interest detected in a particular image, wherein the scoring guide was created by:
        accessing, by the one or more processors, a training image of a tissue specimen presented on a glass slide;
        collecting, by the one or more processors, the set of objects of interest from the training image, wherein the set of objects of interest include biological cells of the tissue specimen;
        extracting, by the one or more processors, a plurality of features from each object of the set of objects of interest;
        applying, by the one or more processors, a clustering algorithm to the extracted plurality of features to automatically cluster the set of objects of interest to form a plurality of classifiable subsets;
        automatically generating, by the one or more processors, the scoring guide based on the plurality of classifiable subsets, wherein the scoring guide includes a set of clustering instructions and a set of image galleries, and wherein:
            each image gallery of the set of image galleries includes a set of image representations corresponding to objects of interest of a classifiable subset of the plurality of classifiable subsets; and
            the set of clustering instructions specify a manner of scoring and classifying cells depicted in other images; and
        storing, by the one or more processors, the scoring guide in the database;
    executing, by the one or more processors, the scoring guide onto a new set of objects of interest, to automatically cluster each object of interest of the new set of objects of interest into a corresponding subset of the classifiable subsets; and
    providing, by the one or more processors, an object-by-object report based on the execution of the scoring guide, wherein providing the object-by-object report includes providing a cell-by-cell read-out of heterogeneous tumor biomarkers based on stain appearances.

2. The method of claim 1, wherein generating the scoring guide further includes, prior to generating the scoring guide, interactively refining the plurality of classifiable subsets, wherein generating the scoring guide is based on the refined classifiable subsets.

3. The method of claim 1, wherein generating the scoring guide based on the plurality of classifiable subsets includes allowing a user to identify each subset of the plurality of classifiable subsets.

4. The method of claim 1, wherein generating the scoring guide based on the plurality of classifiable subsets includes allowing a user to merge two or more image galleries of the set of image galleries to generate a merged classifiable subset, wherein the merged classifiable subset includes objects of interest have a substantially similar biological meaning.

5. The method of claim 1, wherein generating the scoring guide based on the plurality of classifiable subsets includes allowing a user to split an image gallery of the set of image galleries to generate two or more corresponding classifiable subsets, wherein at classifiable subset of the two or more corresponding classifiable subsets include objects of interest that have biological meanings that substantially differ from biological meanings of another classifiable subset of the two or more corresponding classifiable subsets.

6. The method of claim 1, wherein providing the object-by-object report includes reporting a number and spatial distribution of the objects of interest for each classifiable subset of the plurality of classifiable subsets.

7. A system comprising one or more processors and at least one memory, the at least one memory storing instructions which, when executed by the one or more processors, cause the system to perform one or more operations comprising:

accessing, by one or more processors of a computer system, a scoring guide from a database, wherein the scoring guide facilitates classification of an object of interest detected in a particular image, wherein the scoring guide was created by:
   accessing, by the one or more processors, a training image of a tissue specimen presented on a glass slide;
   collecting, by the one or more processors, a set of objects of interest from the training image, wherein the set of objects of interest include biological cells of the tissue specimen;
   extracting, by the one or more processors, a plurality of features from each object of the set of objects of interest;
   applying, by the one or more processors, a clustering algorithm to the extracted plurality of features to automatically cluster the set of objects of interest to form a plurality of classifiable subsets;
   automatically generating, by the one or more processors, the scoring guide based on the plurality of classifiable subsets, wherein the scoring guide includes a set of clustering instructions and a set of image galleries, and wherein:
      each image gallery of the set of image galleries includes a set of image representations corresponding to objects of interest of a classifiable subset of the plurality of classifiable subsets; and
      the set of clustering instructions specify a manner of scoring and classifying cells depicted in other images; and
   storing, by the one or more processors, the scoring guide in the database;
executing, by the one or more processors, the scoring guide onto a new set of objects of interest, to automatically cluster each object of interest of the new set of objects of interest into a corresponding subset of the classifiable subsets; and
providing, by the one or more processors, an object-by-object report based on the execution of the scoring guide, wherein providing the object-by-object report includes providing a cell-by-cell read-out of heterogeneous tumor biomarkers based on stain appearances.

8. The system of claim 7, wherein generating the scoring guide further includes, prior to generating the scoring guide, interactively refining the plurality of classifiable subsets, wherein generating the scoring guide is based on the refined classifiable subsets.

9. The system of claim 7, wherein generating the scoring guide based on the plurality of classifiable subsets includes allowing a user to identify each subset of the plurality of classifiable subsets.

10. The system of claim 7, wherein generating the scoring guide based on the plurality of classifiable subsets includes allowing a user to merge two or more image galleries of the set of image galleries to generate a merged classifiable subset, wherein the merged classifiable subset includes objects of interest have a substantially similar biological meaning.

11. The system of claim 7, wherein generating the scoring guide based on the plurality of classifiable subsets includes allowing a user to split an image gallery of the set of image galleries to generate two or more corresponding classifiable subsets, wherein a classifiable subset of the two or more corresponding classifiable subsets include objects of interest that have biological meanings that substantially differ from biological meanings of another classifiable subset of the two or more corresponding classifiable subsets.

12. The system of claim 7, wherein providing the object-by-object report includes reporting a number and spatial distribution of the objects of interest for each classifiable subset of the plurality of classifiable subsets.

13. A non-transitory computer-readable medium comprising instructions which, when executed by one or more processors of a computing system, cause the computing system to perform one or more operations comprising:

accessing, by one or more processors of a computer system, a scoring guide from a database, wherein the scoring guide facilitates classification of an object of interest detected in a particular image, wherein the scoring guide was created by:
   accessing, by the one or more processors, a training image of a tissue specimen presented on a glass slide;
   collecting, by the one or more processors, a set of objects of interest from the training image, wherein the set of objects of interest include biological cells of the tissue specimen;
   extracting, by the one or more processors, a plurality of features from each object of the set of objects of interest;
   applying, by the one or more processors, a clustering algorithm to the extracted plurality of features to automatically cluster the set of objects of interest to form a plurality of classifiable subsets;
   automatically generating, by the one or more processors, the scoring guide based on the plurality of classifiable subsets, wherein the scoring guide includes a set of clustering instructions and a set of image galleries, and wherein:
      each image gallery of the set of image galleries includes a set of image representations corresponding to objects of interest of a classifiable subset of the plurality of classifiable subsets; and
      the set of clustering instructions specify a manner of scoring and classifying cells depicted in other images; and
   storing, by the one or more processors, the scoring guide in the database;
executing, by the one or more processors, the scoring guide onto a new set of objects of interest, to automatically cluster each object of interest of the new set of objects of interest into a corresponding subset of the classifiable subsets; and
providing, by the one or more processors, an object-by-object report based on the execution of the scoring guide, wherein providing the object-by-object report includes providing a cell-by-cell read-out of heterogeneous tumor biomarkers based on stain appearances.

14. The non-transitory computer-readable medium of claim 13, wherein generating the scoring guide further includes, prior to generating the scoring guide, interactively refining the plurality of classifiable subsets, wherein generating the scoring guide is based on the refined classifiable subsets.

15. The non-transitory computer-readable medium of claim 13, wherein generating the scoring guide based on the plurality of classifiable subsets includes allowing a user to identify each subset of the plurality of classifiable subsets.

16. The non-transitory computer-readable medium of claim 13, wherein generating the scoring guide based on the plurality of classifiable subsets includes allowing a user to merge two or more image galleries of the set of image galleries to generate a merged classifiable subset, wherein the merged classifiable subset includes objects of interest have a substantially similar biological meaning.

17. The non-transitory computer-readable medium of claim 13, wherein generating the scoring guide based on the plurality of classifiable subsets includes allowing a user to split an image gallery of the set of image galleries to generate two or more corresponding classifiable subsets, wherein a classifiable subset of the two or more corresponding classifiable subsets include objects of interest that have biological meanings that substantially differ from biological meanings of another classifiable subset of the two or more corresponding classifiable subsets.

18. The non-transitory computer-readable medium of claim 13, wherein providing the object-by-object report includes reporting a number and spatial distribution of the objects of interest for each classifiable subset of the plurality of classifiable subsets.

\* \* \* \* \*